March 12, 1963 — H. VON STWOLINSKI — 3,080,806
PHOTOGRAPHIC APPARATUS
Filed Oct. 22, 1958 — 6 Sheets-Sheet 1

Inventor
Helmuth von Stwolinski

March 12, 1963  H. VON STWOLINSKI  3,080,806
PHOTOGRAPHIC APPARATUS
Filed Oct. 22, 1958  6 Sheets-Sheet 3

Inventor
Helmuth von Stwolinski
by

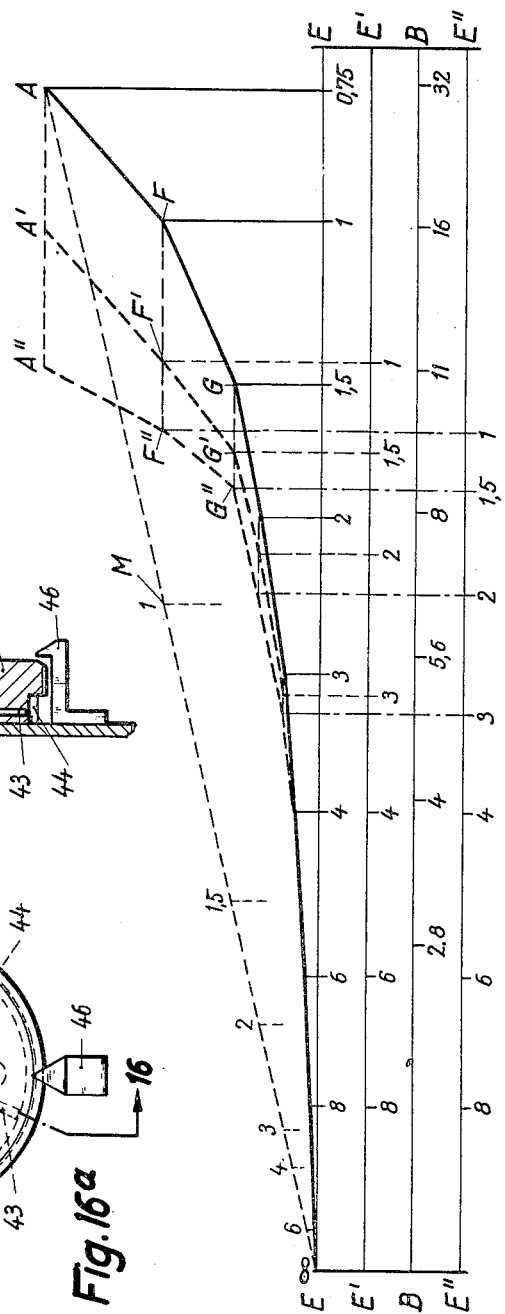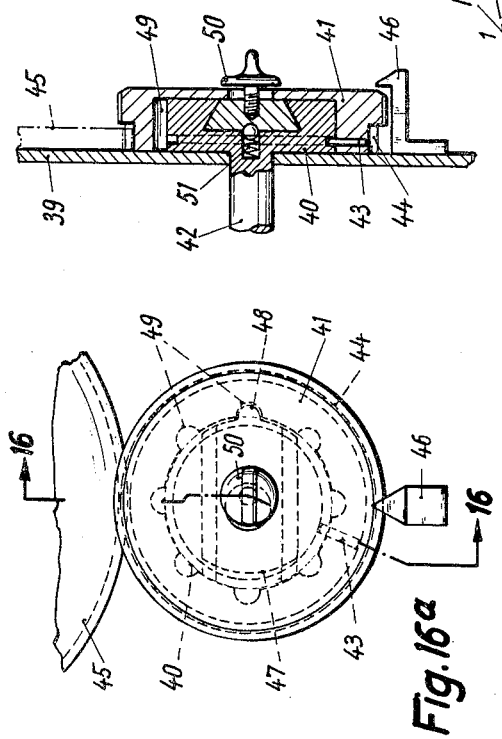

United States Patent Office 3,080,806
Patented Mar. 12, 1963

3,080,806
PHOTOGRAPHIC APPARATUS
Helmuth von Stwolinski, Zurich, Switzerland, assignor to Studio Gesellschaft für Industrie- und Modephotographie Anstalt, Vaduz, Liechtenstein
Filed Oct. 22, 1958, Ser. No. 768,921
Claims priority, application Germany Oct. 29, 1957
21 Claims. (Cl. 95—64)

The invention relates to a device in photographic apparatus, particularly for use with sources of artificial light, which are arranged jointly with the apparatus at the desired distance from the object.

In so-called night photographs, such flash-light devices connected with a camera are used as the only source of light. Alternatively they may be used together with other sources of light, particularly as an additional source of light for daylight photographs in counterlight or lateral light in order to brighten the shades and are practically essential particularly for making printable color film photographs because color film emulsions generally cannot accommodate a contrast ratio exceeding 1:4.

In order to achieve a uniform illumination of the sensitive material a very exact setting of the camera is required. To the artificial light component the so-called flash factor rule $F = A \times D$ (F=flash factor, A=aperture, D=distance) is applicable whereas the usual requirements expressed, e.g., in the known light value rule, must be complied with. In the case of a separate adjustment of the different values an adjustment of the camera to comply with these requirements would require complicated considerations and several operations in each case. It must also be borne in mind that in color photography a small deviation of the illumination from the optimum values determined by the above-mentioned rules involves a considerable reduction in the quality of the photograph and will in any case render the same unsuitable for a printed reproduction.

It has already been attempted to simplify the operation of the camera and to relieve the photographer as far as possible from complicated considerations and computations. More particularly, it has been attempted in various ways to enable the various adjusting elements to be coupled to each other in order to reduce the number of adjustments which must be separately effected by hand.

In this connection it is known, e.g., to provide a light value coupling between the diaphragm setting and the exposure time setting. The light value coupling, however, is suitable only for strict daylight photographs or for the daylight component of mixed-illumination photographs.

In making flashlight photographs each setting of the three adjustable values applies only to one distance because distance is a factor in the flash factor rule applicable to such photographs. A change of the distance setting requires a change of the diaphragm setting and—if daylight is present at the same time—also a change of the exposure time setting.

Devices in which the diaphragm is automatically adjusted in the case of an adjustment of the distance setting to maintain the flash factor have been described, e.g., in the U.S. Patent No. 2,464,559. The means shown there are suitable for various flash factors, which can be selectively adjusted. These known devices are complicated and, more particularly, do not enable a highly accurate setting. Because a simultaneous change of the exposure time is not provided for, the known devices are only suitable for straight flashlight photographs ("night photographs") in which there is no need for a simultaneous change of the exposure time.

It is an object of the invention to provide a device which is suitable for effecting a simple, automatic setting of a camera in dependence on the distance setting and which avoids the disadvantages of the known devices.

More particularly, it is an object of the invention to provide such a device in photographic cameras for flashlight photography with or without daylight, which device is suitable for a very large number of different flash factors, simple and inexpensive in manufacture and enable a highly accurate setting.

To avoid the afore-described disadvantages of the known devices of this kind the invention provides that the means which are provided between the rotary distance setting member and the lens to cause the focusing of the lens in response to an actuation of the distance setting member are constructed so that the distance setting member has a logarithmic distance scale corresponding to the distance settings and is arranged to be coupled in different relative positions with setting members which correspond to additional, different adjustable variable and which carry also logarithmic scales in a manner known per se, either directly or through the intermediary of members having only a linear effect, and that in the coupled condition an adjustment of any of the coupled settings positively causes the others to be adjusted so that different relations, in which said adjustable variables are multiplicatively linked, are automatically maintained with high accuracy in dependence on the relative arrangement of the coupled scales.

The logarithmic design of the distance scale may be provided by an appropriate design of the focusing means without any additional expenditure compared to known lenses. For instance, in a camera which has a slidable lens tube and in which focusing is effected by controlling the lens tube by means of a rotary sleeve, the guide slot of the rotary sleeve may be cut in such a manner as to provide for the desired logarithmic design of the distance scale. In a reflex camera, in which the distance setting means provided on one side wall of the camera acts by means of a cam on the slidable part of the lens mounted at the front wall, the cam may be designed in a simple manner to provide for the desired logarithmic design of the distance scale on the distance ring.

The logarithmic design of the distance scale and the resulting large number of coupling positions available between the distance setting and the other adjustable variables results in a unique simplification and facilitation of the operation of the camera while providing for a highly accurate setting.

Additional advantages and details of the invention will be apparent from the following description of illustrative embodiments shown in the drawing, in which FIG. 1 shows an embodiment of the invention in which a coupling is provided between the distance and diaphragm setting members, the lens with the rotary sleeve controlling the lens tube being shown in axial section.

FIG. 15 shows a graph corresponding to FIG. 3 and illustrates the relation between the adjustment of the lens and the distance scale. According to another embodiment of the invention the distance scale is condensed in the near range relative to a logarithmic scale.

FIGS. 16 and 16a are a sectional view and top plan views, respectively, showing a device for coupling two relatively rotatable concentric parts for joint rotation.

Figure 1:
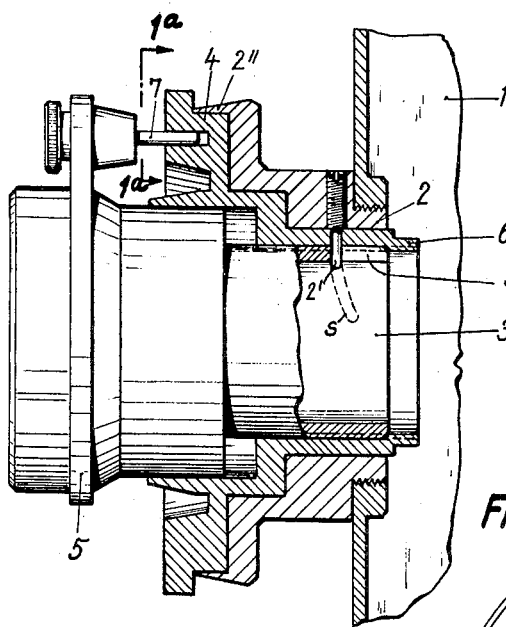
FIG. 1 shows an embodiment of the invention which has the special advantage that it is mounted on the lens itself so that the previously used lens of an existing camera may be replaced, if desired, by a new lens provided with the device according to the invention.

In the embodiment according to FIG. 1 the lens assembly comprises in a manner known per se the lens mount 2 which is screwed into the camera housing 1 and in which the lens tube containing the slidable lense system is longitudinally slidably guided. The longitudinal displacement of the lens tube is effected by a rotatable tube holder or focusing sleeve 6, which has for this purpose a slot s, which engages a pin 2'. To prevent a rotation of the tube 3, this stationary pin 2' engages at the same time a longitudinal slot 3' of the tube 3, which is connected by a fine thread to the tube holder 6. The setting of the ring 4 to a desired distance will thus move the tube 3 with the lens forwardly and the gap thus formed between parts 2 and 6 will remain covered. The tube 3 will follow the axial movement of the tube holder 6 during a rotation of the latter but is held against rotation by the pin 2. It will be appreciated that the fine thread may be replaced by other means for imparting an axial movement to the tube 3 in the case of a rotation of the holder 6. For instance, the tube holder 6 may comprise a radially inwardly protruding headless screw, which engages an annular groove on the outside periphery of the tube 3.

Figure 2:
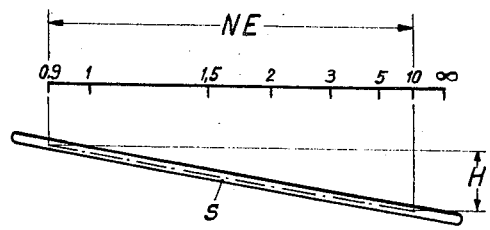
FIGS. 2 and 3 show diagrammatically the relation between the guide slot and the distance scale is a lens according to FIG. 1 for a known camera and for a camera according to the invention, respectively.

The distance scale may be provided in known manner either on the setting ring 4 or on the outer periphery 2" of the lens mount 2. Its design will depend on the design of the slot s which controls the movement of the lens. This relation is diagrammatically shown in FIGS. 2 and 3. FIG. 2 shows a usual straight slot, which is associated with the distance scale NE on the distance setting member. This distance scale has an arbitrary design depending on the law of imagery of the lens.

Figure 3:
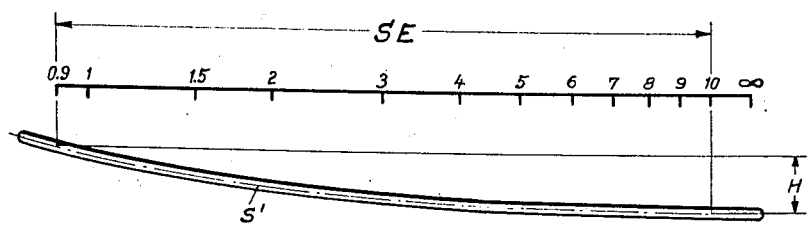

The simple modification of the design of the cam slot s° as shown in FIG. 3 compared to the straight design s in FIG. 2 enable the provision of the logarithmic distance scale SE according to the invention on the distance setting member. (Both FIGS. 2 and 3 are based on the same maximum adjustment H.)

The lens carried by the tube 3 incorporates the iris diaphragm, which is by the diaphragm setting ring 5 and which is designed in a manner known per se in such a manner that approximately equal angular distances on the diaphragm scale correspond to the f-numbers

2—2.8—4—5.6—8—11—16—22, so that the diaphragm scale is also logarithmic. As will be explained hereinafter the f-numbers on the diaphragm scale increase in a direction which is opposite to the direction in which the distances increase on the distance scale. This means that a rotation of the setting rings 4 and 5 in the sense of increasing distances will correspond to decreasing f-numbers or larger diaphragm apertures.

The invention provides means for mechanically coupling the diaphragm ring 5 to the distance ring 4. In the embodiment described a coupling pin 7 is provided for this purpose, which is mounted on the diaphragm ring 5 and can be pulled out and by which the ring 5 can be selectively coupled to the ring 4 by means of bores provided on the end face of the ring 4 in different angular positions, which correspond to different flash factors. The end bores which are provided on the ring 4 and with which the pin 7 cooperates are marked with the respective flash factors. When the coupling pin 7 has been pulled out the coupling may be set, if desired, to another flash factor or the coupling between the distance and diaphragm settings may be entirely removed. The bores in the end face of the ring 4, which correspond to the flash factors, are preferably also arranged in equal angular distances so that the flash factor scale is also logarithmic. This scale may be additionally provided on the distance setting ring 4.

Figure 1A:
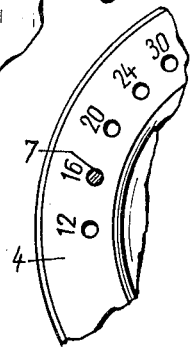
FIG. 1a is a fragmentary front elevation taken on line 1a—1a of FIG. 1.

FIG. 1a is a fragmentary front elevation of the distance ring 4. It shows the end bores which correspond to various flash factors. In FIG. 1a the coupling has been made, e.g., for the flash factor 16.

Figure 4:
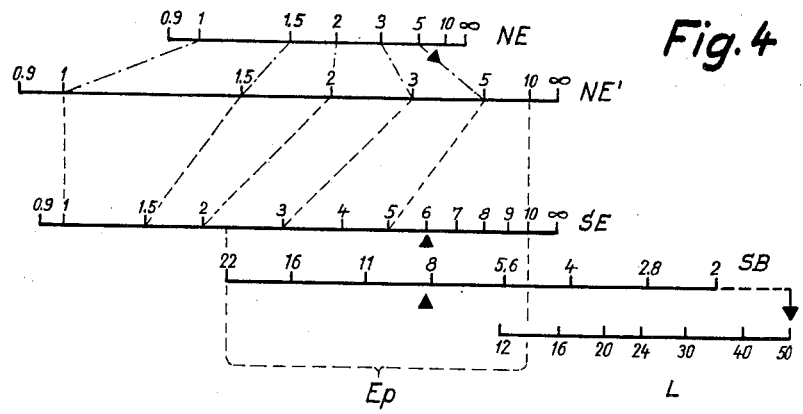
FIGS. 4 and 5 are graphs illustrating the operation of the coupling provided according to the invention between the distance and diaphragm scales.

The mode of operation of the apparatus described will be described with reference to FIGS. 4 and 5.

In FIG. 4, NE designates again the non-logarithmic distance scale of a conventional camera. This scale is shown to be proportionally extended at NE' to enable a comparison with the logarithmic distance scale SE according to the invention. A flash factor scale L, which is also logarithmic, is fixedly connected to the logarithmic distance scale. A diaphragm scale which is adjustable relative to the distance scale SE and relative to the flash factor scale L is indicated at SB. This can be connected for rotation with the distance (and flash factor) scale in different positions relative thereto.

The selected relative position corresponds to a certain flash factor, which can be read from the flash factor scale L. FIG. 4 is based on a flash factor 50. With this setting the aforesaid rule $F = A \times D$ (or $L = B \times E$) will always be fulfilled in the usable distance range Ep from about 2.3 meters to about 10 meters during a coupled adjustment of the distance ring and of the diaphragm ring 5. For instance, when the distance ring is set to a fixed mark for 6 meters the diaphragm will be automatically set to a value of about 8.4.

Figure 5:
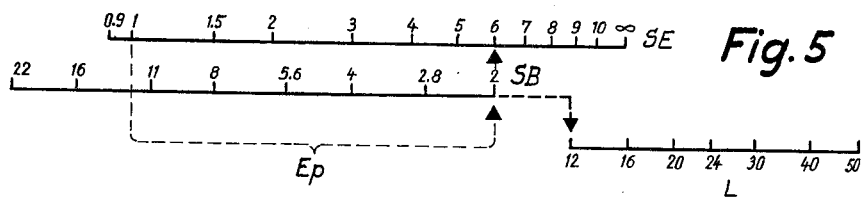

FIG. 5 shows the corresponding graph for the setting to the flash factor 12. It is apparent that in this case the usable distance range extends from 1 meter to 6 meters.

Figure 6:
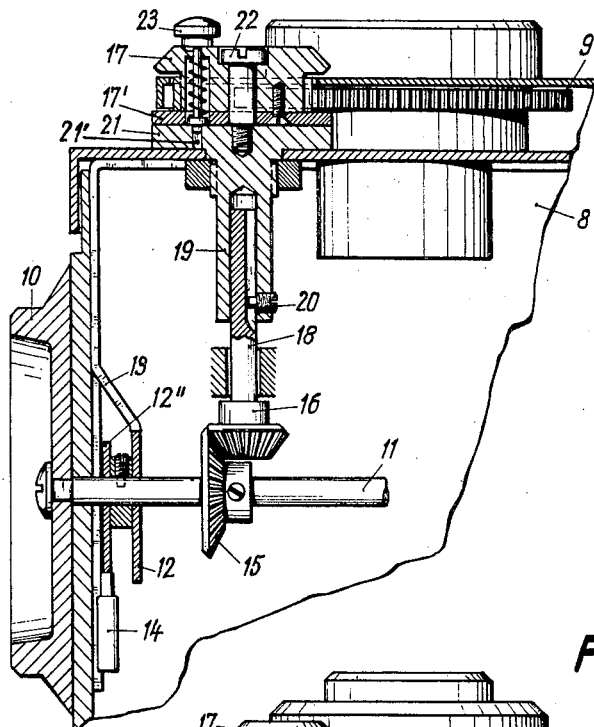
FIG. 6 shows another embodiment of the invention comprising a coupling between the distance and diaphragm settings, the corresponding setting members being arranged on different sides of the camera, e.g., in a reflex camera.
Figure 9:
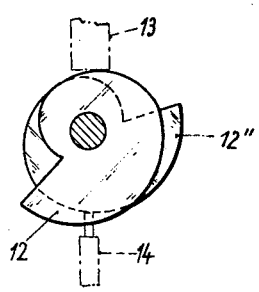
FIG. 9 shows a detail of the embodiments shown in FIGS. 6 and 8.

FIG. 6 shows an embodiment of the invention in a two-lens reflex camera, in which the lens and the diaphragm ring 9 are arranged on the end face of the camera 8 and the distance ring 10 is arranged on the side wall of the camera. The distance ring 10 acts through a shaft 11 and a cam 12 fast thereon on a slidably mounted frame 13, which carries the movable part of the lens. This frame 13 is also under the action of a second, oppositely moving cam 12", which is engaged by a spring-loaded stop 14, as is shown in side elevation in FIG. 9. The displacement of the lens caused by a rotation of the ring 10 is thus determined by the shape of the cam 12.

The rotation of the shaft 11 is also transmitted by the bevel wheels 15, 16 to a setting knob 17, which is arranged on the end face of the camera and the toothed rim of which is in mesh with the diaphragm ring 9, which is also toothed. The bevel wheel 15 is fast on the shaft 11. The bevel wheel 16 is fast on a rotatable stub shaft 18, which is coupled for rotation with the rotatably mounted stub shaft 19 of the diaphragm setting ring 17 in such a manner that the two parts 18 and 19 can be axially moved relative to each other. To this end a pin 20 inserted in part 19 can engage a longitudinal groove of the part 18, as is shown.

In order to enable a selection of the flash factor, the diaphragm setting knob 17 is rotatably held against the flange plate 21 of the stub shaft 19 by a screw 22 and can be coupled to said plate in different angular positions by a pin 23, which can be pulled out. For this purposes the flange plate 21 is provided with a number of bores 21', which are disposed on a circle and which correspond to the different flash factors as in the arrangement shown in FIG. 1. These flash factors may be shown, e.g., on the outside periphery of the flange plate 21 and may be read against a mark provided on the intermediate plate 17' firmly connected to the setting knob 17. It is particularly desirable to provide the flash factors on the end face of the screw head 22 so that these numbers can be read from the front against a mark on the knob 17 or directly against the pin 23. It is obvious that the relative arrangement of the scale and mark may be interchanged in all cases.

Figure 7:
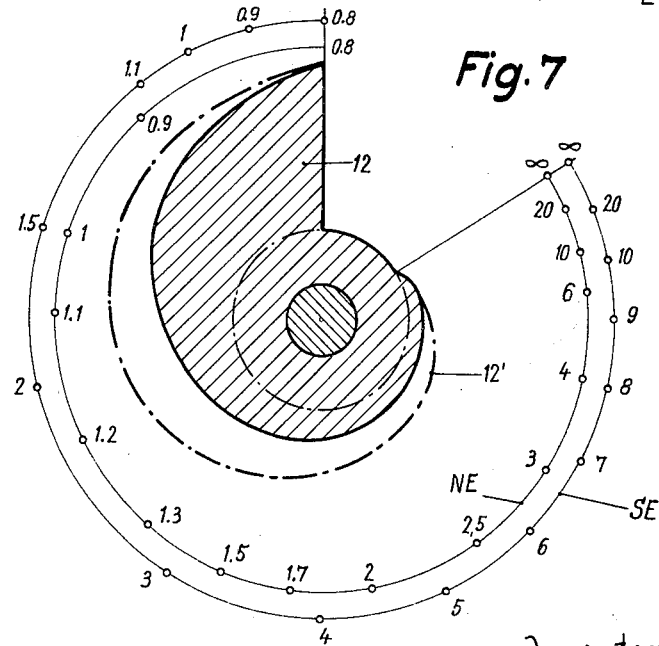
FIG. 7 shows the focusing cam used in the embodiment according to FIG. 6.

In FIG. 7 the lens feeding cam is shown. The usual design of this cam is indicated with dash and dot lines at 12'; this corresponds to the usual distance scale NE. The cam shape modified according to the invention is illustrated by the hatched area, which corresponds to the logarithmic distance scale SE.

Figure 8:
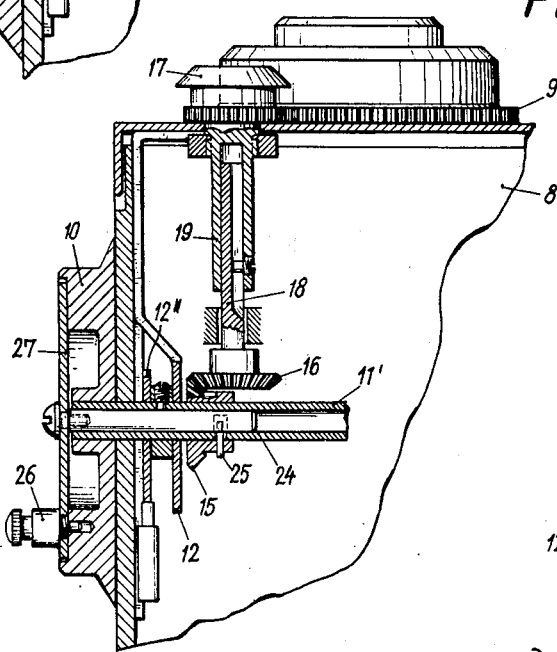
FIG. 8 shows a modification of FIG. 6.

FIG. 8 shows a construction which corresponds to FIG. 6 but differs from it in that the flash factor selector is provided on the distance knob 10 rather than on the diaphragm setting knob 17. To this end the shaft 11' fixedly connected to the distance knob 10 consists of a hollow shaft, on which the cam 12 is mounted for rotation therewith. The hollow shaft 11' contains another shaft 24, which drives the bevel wheel 15, which is freely rotatable on the hollow shaft 11', by means of a pin 25, which extends through an arcuate slot in the hollow shaft 11'. The inner shaft 24 carries a selector disc 27, which is provided with the flash factor scale and can be coupled to the distance knob 10 in different angular positions, which correspond to the flash factors, by means of a detachable pin 26, in an arrangement similar to that of FIG. 1. For this purpose the distance knob 10 is provided with appropriate bores, in which the pin 26 can be selectively inserted.

Figure 10:
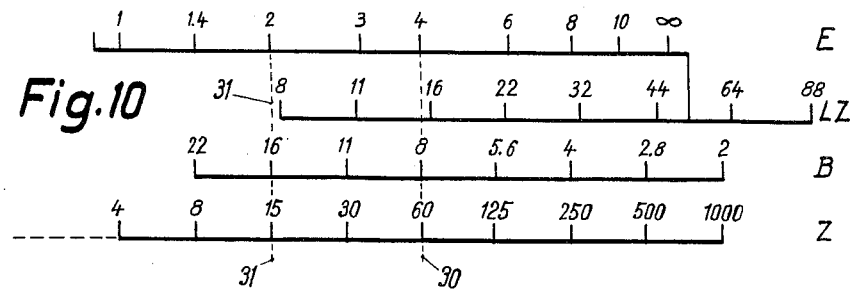
FIG. 10 is a graph showing the scale arrangement in an embodiment of the invention comprising a coupling between the distance, diaphragm and exposure time settings.

According to another advantageous embodiment of the invention provision is also made for coupling the (logarithmic) exposure time scale with the other setting members. The graduation and the relative arrangement of the scales which serve for setting the lens is diagrammatically shown in FIG. 10 for this ternary coupling. In FIG. 10, E denotes the distance scale, Lz the flash factor scale which is fixedly connected or rigidly coupled therewith, B the diaphragm scale and Z the exposure time scale. All four scales have a logarithmic graduation. The scales E, Lz and B have equal base lengths, whereas the scale Z has only half the base length of the other scales.

In the example shown the relative setting of scales B and E corresponds to the flash factor 36 (with f-numbers 16, 8, and 4 corresponding to distances of 2 meters, 4 meters, and 8 meters, respectively). In this example the time scale is so adjusted relative to the distance and diaphragm scales that an exposure time of 1/60 second is associated with the pair of values E=4, B=8 indicated by the straight dash line 30. When the scales E, B and Z are coupled in the relative positions shown and, e.g., the distance is changed from 4 meters to 2 meters, the settings of the diaphragm and exposure time scales will be positively changed too in such a manner that the flash factor rule is complied with for the relation between distance and aperture and, e.g., the known light value rule is fulfilled for the relation between the aperture and exposure time. The new setting is indicated by the straight dash line 31 and characterized by the three values "2 meters, f/16, 1/15 second."

As is apparent from FIG. 10 the scales are arranged and subdivided in such a manner that the aperture ratio (ratio between the focus and the diaphragm diameter) will vary in inverse proportion with the distance during their positive joint adjustment. Moreover, the exposure time will vary in proportion with the square of the aperture ratio and, consequently, with the reciprocal value of the square of the distance.

Figure 11:
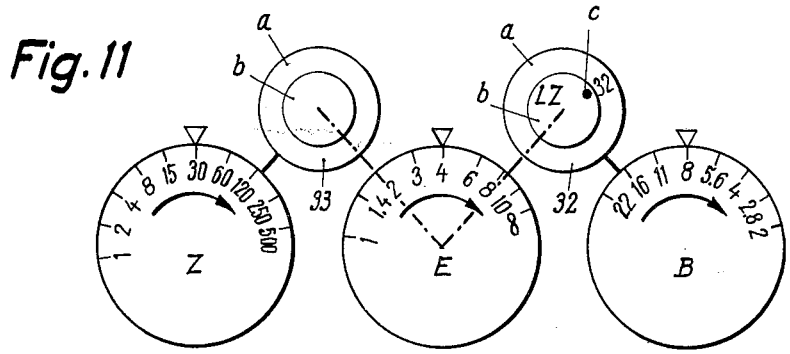
FIGS. 11 and 12 show symbolically two different kinds of scale arrangement and coupling possibilities in such an embodiment having a ternary coupling according to FIG. 10.
Figure 12:
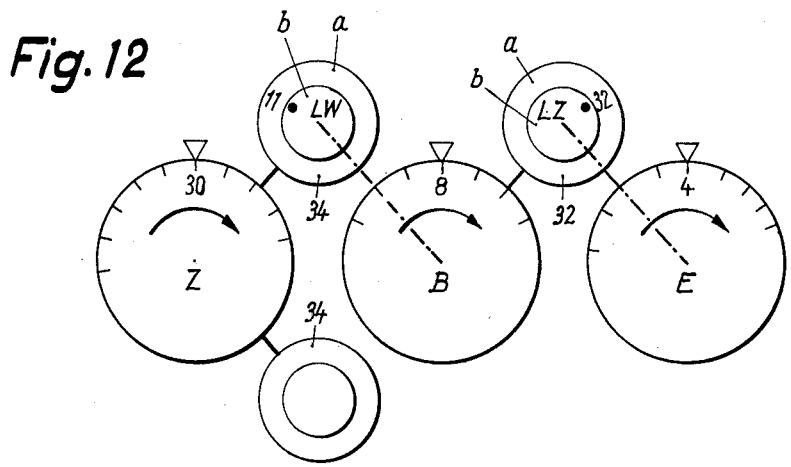

In the symbolic showings in FIGS. 11 and 12 the three circular discs Z, E, B denote the setting rings for the photographic apparatus, which rings correspond to the logarithmic scales shown linearly in FIG. 10. In this embodiment of the invention the setting rings carrying the scales can be indirectly coupled to each other by separate coupling means 32, 33, 34, which will be described hereinafter, rather than directly.

This indirect coupling is preferably used in apparatus in which the setting members (setting rings) associated with the three adjustable variables are spaced from each other and arranged, e.g., on different walls of the camera box. The couplings 32, 33, 34 are diagrammatically indicated by two concentrically arranged parts a, b, each of which is rigidly coupled to one of the two setting members to be coupled and which can be coupled for joint rotation in different positions relative to each other.

In the embodiment shown in FIG. 11, two independent coupling means 32 and 33 are provided, the inner parts b of which are coupled to the distance setting member, e.g., to the shaft of the distance setting ring, for joint rotation. The coupling 32 which connects the distance and diaphragm setting rings serves as a flash factor adjusting means. The flash factor which has been set can be read, e.g., from a flash factor scale provided on the outer part a with reference to a mark c provided on the inner part. It is obvious that the arrangement of the scale and mark may be reversed.

For flashlight photographs taken at night only the coupling 32 is operated. For daylight photographs brightened by flashlight, both couplings 32, 33 are needed. The flash factor coupling 32 is set in accordance with the flash factor required for brightening the foreground. The coupling 33 is then operated in such a relative position of its parts a, b that for any aperture which has been set an exposure time setting will be obtained which corresponds to the light value determined to the conditions under which the photograph is taken. The light value cannot be read because a light value scale provided on the coupling 33 would apply only to a certain flash factor.

A particularly advantageous embodiment of the ternary coupling, in which the flash factor and the light value can be selected and read, is shown in FIG. 12, in which the time scale can be coupled to by means of the light value coupling 34 to the diaphragm scale B rather than to the distance scale E. In this case the flash factor can be selected and set at the coupling 32, as in the foregoing case, and the light value can be selected and set at the coupling 34.

If only the coupling 32 is operated the flash factor coupling which is suitable for flashlight photographs at night has been provided. If only the coupling 34 is operated, the known light value coupling will be obtained between the diaphragm and time settings.

Figure 13:
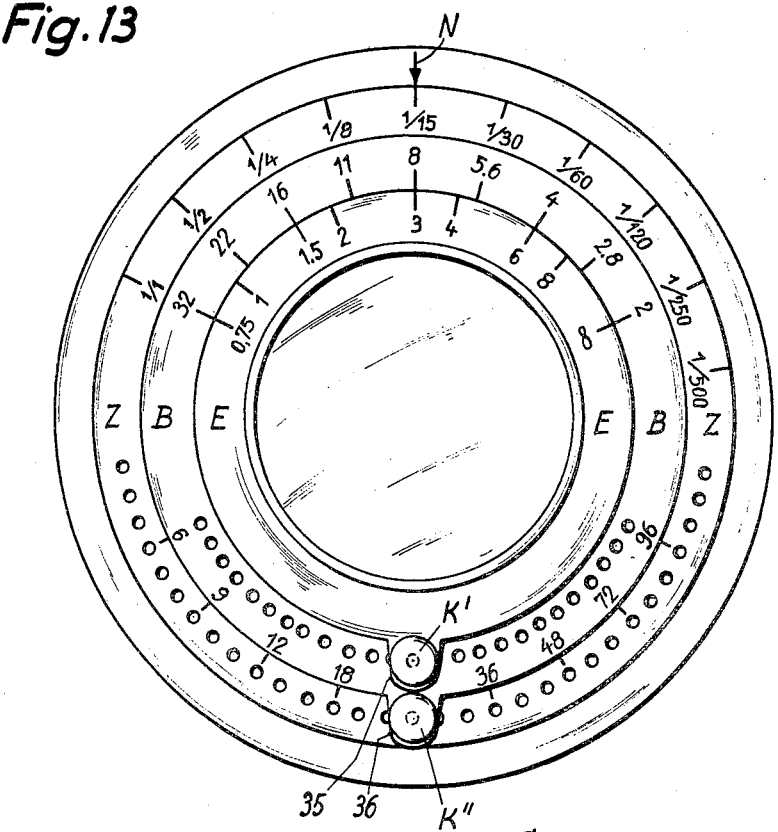
FIG. 13 shows an embodiment of the ternary coupling corresponding to FIG. 12, in which the three setting scales are concentrically arranged.

An advantageous embodiment of the ternary coupling with a concentric arrangement of the three setting scales is shown in FIG. 13. The three rings E, B, Z are relatively rotatable and can be detachably coupled to each other in different relative positions. To this end the setting ring E comprises, e.g., a tongue like extension 35, which is arranged to slide on the diaphragm scale when the distance scale is rotated relative thereto. In this extension 35 a coupling device K′ is guided, which consists, e.g., of a pin, which can engage corresponding openings of the underlying diaphragm ring for operating the coupling or can be pulled out of the engaged position against spring load to release the coupling. By means of an appropriate coupling device K″ the diaphragm and time setting rings can be detachably coupled to each other in different relative positions. To this end the diaphragm ring B carries a tongue 36, which slides over the time setting ring Z and in which a pin is guided which can engage corresponding holes of the time setting ring. The respective settings, i.e. the three values of E, B, Z adjusted by the respective position of the three scales can be read at a common mark N. The respective values for the flash factor and the light value can be directly indicated on the openings provided in the lower half of the diaphragm and time rings, respectively, for receiving the couplings K′ and K″, respectively. This is indicated in FIG. 13 for the flash factor. The spacing of the openings for receiving the pin in the diaphragm and time setting rings is preferably so small that a diaphragm setting to an accuracy of ⅓ or ¼ f-number interval is possible, as is essential for color photographs.

In order to provide a highly accurate setting it is desirable to provide scales which extend over a large angular range. On the other hand, the base lengths of the scales (in degrees) must match each other. The maximum angular range of the scales is generally limited by the diaphragm scale because diaphragm apertures can hardly be controlled over a range of more than 90° in the case of a direct transmission from the setting ring. For this reason an additional embodiment of the invention comprises a reducer gear for increasing the angular range of the diaphragm setting scale. This is shown in FIG. 14, in which B′ indicates the diaphragm ring directly connected to means for controlling the diaphragm leaves whereas B″ is the diaphragm setting ring which is connected by a reducer gear to B′ and carries the logarithmic diaphragm scale.

Figure 14:
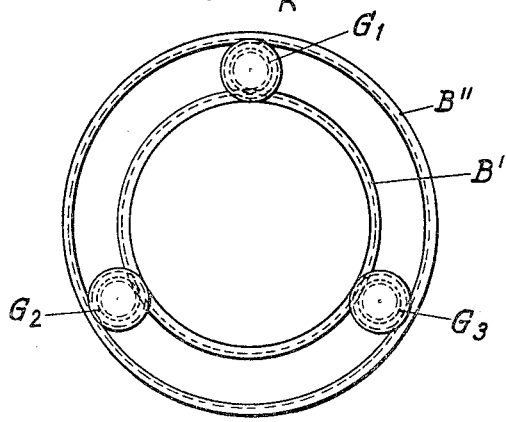
FIG. 14 shows an accessory for spreading the diaphragm scale with the aid of a reducer gear.

Between both rings a gear is arranged, which consists preferably of three pairs of toothed wheels $G_1$, $G_2$, $G_3$, which pairs are spaced 120° apart, if the two rings B′ and B″ are concentrically arranged as is shown in FIG. 14. The inner diaphragm ring B′ having an external toothing meshes with pinions of the gears $G_1$, $G_2$, $G_3$ whereas the internally toothed outer diaphragm ring B″ engages the larger wheels of the gears, which larger wheels are flanged to the pinions.

The three pairs of gear wheels $G_1$, $G_2$, $G_3$ are rotatably mounted on their respective shafts which are fixedly connected to the lens housing, e.g., with screws. Thus, an angular range of less than 90° for the inner diaphragm ring, as is usual in normal diaphragm ring, has associated therewith a correspondingly larger angular range on the outer diaphragm ring. As a result the diaphragm scale on the outer diaphragm ring B″ is spread relative to B′. A highly accurate setting can thus be obtained by an appropriate selection of the distance and time scales.

It is known that the flash factor rule which must be fulfilled by flashlight component of the illumination of photographs to ensure a uniform illumination of the sensitized material and on which the coupling between different variables and the distance setting is based in the described embodiment of the invention, is strictly applicable only for relatively large object distances, i.e. for distances of more than 60 mm. focal lengths. In the adjoining range of smaller distances, i.e., in normal cameras for distances of about 3 meters and less the observation of the flash factor rule will result in increasing degree of underexposures.

This underexposure is due, on the one hand, to the fact that for these small object distances the flashlight bulb together with the reflector can no longer be considered a point source of light but acts as a surface-type of light source. In addition to this decrease in illumination which is due to the flashlight technology and which affects all lenses irrespective of their focal length, lenses having a large focal length are additionally subject to an "optical" decrease in illumination which is due to the increased distance of the lens from the sensitized material.

For the zones of the near range which are defined by the distances of 3 meters—2 meters—1.5 meter—1 meter and less it has been found that the decrease in illumination due to the lighting technology correspond to ⅛, ¼, ½ and 1 f-number interval, respectively. This is increased by the above-mentioned optical decrease in illumination.

One embodiment of the invention in which this departure from the flash factor rule in the near range is corrected thereby that the distance scale, which is logarithmic according to the invention, is condensed in the near range relative to the logarithmic design, is shown in FIG. 15. FIG. 15 corresponds to FIGS. 3 and 7 and shows various can shapes of the member which controls the focusing movement of the lens.

According to the invention the member which controls the focusing movement of the lens (guide slot s in the rotary sleeve type of control shown in FIGS. 1 to 3 and cam 12 in FIGS. 6 to 9) is formed to provide for a logarithmic distance scale on the distance setting ring. The solid line curve A, F, G in FIG. 15 represents a curve which corresponds to a logarithmic distance scale E on the axis of abscissas.

The ordinates of curve A which are associated with the several distances represent the respective focusing movement of the lens. The curve itself can be considered a developed view of the guide slot in a construction comprising a rotary sleeve type of control, as is shown in FIGS. 1 to 3, or as the length of the radius vector in a construction comprising a cam for controlling the focusing movement.

In the figure, an oppositely arranged diaphragm scale B is shown below the distance scale E. It is assumed that the two scales have been coupled at a flash factor 16. In this case the f-numbers 16, 8 and 4 correspond to distances of 1 meters, 2 meters, and 4 meters, respectively.

According to the invention the curve is modified in the near range below approximately 3 meters so that the ordinates associated with the distances of 3 meters, 2 meters, 1.5 meter, 1 meter, are displaced to the left by ⅛, ¼, ½ and 1 f-number interval respectively. If the resulting points are connected, the dash line curve A′, F′, G′ will be obtained, whereby the decrease of illumination in the near range due to flashlight technology is indirectly corrected. According to the new design of the curve e.g., the focusing movement which corresponds to point F of curve A is already reached at F′, i.e., one f-number interval before at f/11 rather than f/16. Similar remarks apply to the focusing displacement G which corresponds to a distance setting to 1.5 meters and which is already reached according to curve A′ at G′, half an f-number interval before. The new curve A′ has associated therewith the new distance scale E′, which deviates from the logarithmic distance scale E below 3 meters and is condensed relative thereto. As a result of this correction of the curve the several distance settings in the near range of the camera have automatically associated therewith larger diaphragm apertures than would correspond to the flash factor rule. In accordance with the values stated the amount of correction is such that the described decrease in illumination is just compensated and underexposure is avoided. This correction is ensured for all different relative positions of the distance and diaphragm scales, which positions correspond to the respective flash factors.

The above-mentioned optical decrease in illumination occurring with lenses having a large focal length in the near range can be compensated with similar means. For instance, the compensation of this additional decrease in illumination in the case of a lens having a focal length of 150 mm. requires in the case of a setting to 3 meters a correction by ⅛ f-number interval, in the case of a setting to 1.6 meters a correction by ¼ f-number interval, in the case of a setting to 1 meter a correction by ½ f-number interval, in the case of a setting to 0.8 meter a correction by ¾ f-number interval and in the case of a setting to 0.75 meter a correction by an entire f-number interval. A correspondingly designed curve is indicated at A''. E'' is the associated distance scale, which is shortened relative to E' in the near range.

This correction has been described hereinbefore with reference to a coupling between the distance and diaphragm settings. It can also be applied to the aforedescribed coupling between the distance setting and the flashlight intensity control.

FIGS. 16 and 16a are a sectional view and a top plan view showing, respectively, a device for coupling two relatively rotatable concentric parts in any desired relative positions. This device may be considered a practical embodiment of the coupling 32, 33, 34 diagrammatically indicated in FIGS. 11 and 12. It is also possible to use it as an alternative to the coupling 17, 21, 22, 13 between the diaphragm ring 9 and the stub shaft 19 driven by the distance setting means shown in FIG. 6.

In FIGS. 16 and 16a two relatively rotatable discs 40 and 41 are arranged on the outside of the wall 39 of a camera housing. The disc 40 is rigidly connected to a shaft 42, which serves for setting one of the variables of the device, e.g., the distance, and the appertaining scale. The disc 41 which is adjustable relative to the disc 40 is held in position by a headless screw 43, and by means of a toothed rim 44 meshes with an additional gear rim 45, which serves for setting another adjustable variable of the apparatus, e.g., the aperture. The scale corresponding to this variable may either be provided on the disc 41 to be read against a mark 46 or may be provided on the toothed rim 45.

A slide 47 which has a semicyclindrical or pin-like extension 48 is radially slidably mounted in a recess of the inner disc 41. The outer ring 41 is formed with several recesses or bores 49 conforming to the extension. With the aid of a knob 50 the slide 47 can be moved from its inoperative position to its coupling position (the upper position of FIG. 16a), in which it connects the discs 40 and 41 for joint rotation. The slide may be held in its respective position either by adequate friction or by a special detent 51 comprising a spring-loaded ball. The relative positions corresponding to the several bores 49 may be marked with numbers, e.g., in the case of a coupling between the distance and diaphragm settings, with flash factors. These numbers can be read from a mark provided on the slide 47.

The teaching of the invention to provide a logarithmic design for the distance scale on the distance setting member by an appropriate design of the focusing means opens up such a large number of possibilities for the couplings between the several adjustable variables that the operation of the camera is decisively simplified and facilitated and that certain regularities between the adjustable variables can be automatically complied with for any desired values of any parameters. Some of these couplings which are possible have been described with reference to the illustrative embodiments of the invention described hereinbefore. From this description, a man skilled in the art will be readily capable of making modifications without departing from the scope of the invention. More particularly, it is possible that in addition to the flash factor rule and the light value rule, on which the couplings in the described illustrative embodiments described hereinbefore are based, other rules can easily be complied with if they are desirable under certain conditions provided that they can be represented by a multiplicative relation between the variables involved.

What is claimed is:

1. In photographic apparatus of the type wherein a source of illumination for illuminating the object to be photographed is maintained in substantially fixed relation with respect to a lens and sensitized surface of said photographic apparatus and hence in variable relation with respect to said object, mechanism for maintaining the lens aperture in predetermined desired relationship with respect to the focal position of the lens, such relationship being represented by the well-known flash factor equation $F=f.D_o$, the improvement comprising in combination a diaphragm for varying said lens aperture; a diaphragm setting member having a logarithmic scale of focal numbers $f$ disposed thereon; first index means relative to which said diaphragm setting member is settable; diaphragm adjusting means operatively interconnecting said diaphragm setting member with said diaphragm; a focus setting member having a distance focussing scale disposed thereon; second index means relative to which said focus setting member with said distance focussing scale is settable; focussing means operatively connecting said focus setting member with said lens for moving said lens to a focal position corresponding to the distance to which said focus setting member with said distance focussing scale thereon has been set relative to said second index means; said focussing means being adapted so that equal displacements of the focus setting member will correspond to a logarithmic sequence of the values of distance focussed by such displacements; coupling means for linearly coupling said diaphragm setting member and said focus setting member selectively in any one of a series of relative positions thereof corresponding to different values of the flash factor F; said coupling means on actuation thereof being operative to mechanically and releasably couple said setting members.

2. Photographic apparatus with mechanism defined in claim 1 wherein said coupling means on actuation thereof are operative to directly couple said diaphragm setting member and said focus setting member.

3. Photographic apparatus with mechanism defined in claim 1 wherein said coupling means comprise means for linearly transmitting movements between said diaphragm setting member and said focus setting member.

4. Photographic apparatus with mechanism defined in claim 1 wherein said diaphragm setting member and said focus setting member each comprise a rotatable ring mounted coaxially with one another and with a fixedly mounted lens mount housing said lens for axial movement thereof, said focusing means comprising a focussing sleeve axially slidably and rotatably mounted in said lens mount and connected to said focus setting ring for rotation therewith and to at least part of said lens for axial movement therewith, said focussing sleeve having a slot formed therein, said slot formed in said focussing sleeve being engaged by a pin protruding in a radial direction inwardly from said fixedly mounted lens mount, said slot being designed to cause on rotation of said focussing sleeve, axial movement of said focussing sleeve and of said part of said lens connected therewith so that said lens is focused for the distance to which said focus setting member with said distance focussing scale thereon is thus set.

5. Photographic apparatus with mechanism defined in claim 4 wherein a lens tube having at least said part of said lens fixedly mounted therein is mounted within said focussing sleeve for axial movement therewith while prevented from rotation therewith relative to said lens mount by said pin radially protruding from said lens mount through said slot in said focussing sleeve into an axial slot formed in said lens tube.

6. Photographic apparatus with mechanism defined in claim 5 wherein said coupling means comprise a coupling pin operable to couple said diaphragm setting and said focus setting rings in any of a series of relative positions for joint rotation.

7. Photographic apparatus with mechanism defined in claim 1 wherein said lens and said focus setting member are mounted on different walls of a camera housing, said lens having a movable part for focussing said lens, said focussing means comprising a cam which operatively connects said focus setting member to said movable part of said lens to focus same to the distance to which the focus setting member with the distance focussing scale thereon has been set.

8. Photographic apparatus with mechanism defined in claim 7 wherein said cam of said focussing means is mounted on a first shaft with the focus setting member rotatable therewith, said shaft further being operatively connected to said coupling means.

9. Photographic apparatus defined in claim 1 further comprising an exposure time setting member having an exposure time scale of logarithmic character disposed thereon, additional coupling means for linearly coupling said exposure time setting member to said focus setting member selectively in any of a series of relative positions of said setting members corresponding to different light values, said exposure time scale on said exposure time setting member and said focal number scale on said diaphragm setting member being oppositely arranged whereby the flash factor selected by actuating said first coupling means for a specific relative position of the diaphragm setting and the focus setting members and the light value selected by actuating said second coupling means for a specific relative position of the exposure time setting and the focus setting members will be maintained during adjustment of the focus setting member.

10. Photographic apparatus with mechanism defined in claim 1, comprising an exposure time setting member having an exposure time scale of logarithmic character disposed thereon, additional coupling means for linearly coupling said exposure time setting member to said diaphragm setting member selectively in any of a series of relative positions of said setting members corresponding to different light values, said exposure time scale on said exposure time setting member and said focal number scale on said diaphragm setting member being oppositely arranged whereby the flash factor selected by actuating said first coupling means for a specific relative position of the diaphragm setting and the focus setting members and the light value selected by actuating said second coupling means for a specific relative position of the exposure time setting and the diaphragm setting members will be maintained during adjustment of the focus setting member.

11. Photographic apparatus with mechanism defined in claim 10 wherein said logarithmic exposure time scale has a base length which is half the base length of said logarithmic focal number scale on said diaphragm setting member.

12. Photographic apparatus with mechanism defined in claim 10 in which said setting members comprise three concentric rotatable rings.

13. Photographic apparatus with mechanism defined in claim 1 wherein said focussing means operatively connecting said focus setting member and said lens are adapted so that the distance focussing scale on said focus setting member in the near range of distances is condensed as compared with the logarithmic character to compensate for a deviation from the flash factor equation $F = f \cdot D_0$ of the illumination in said near range inherent to the use of an artificial light source and/or to camera construction.

14. Photographic apparatus with mechanism defined in claim 13 said focussing means being adapted so that the distance focussing scale in the near range of distances is increasingly condensed as compared with the logarithmic character.

15. Photographic apparatus with mechanism defined in claim 14 wherein said focussing means are adapted so that said distance focussing scale is corrected in the near range by increasing amounts, said amounts corresponding to $\frac{1}{8}$, $\frac{1}{4}$, $\frac{1}{2}$ and 1 interval of focal number, when said focus setting member is coupled to said diaphragm setting member, for distances of 3, 2, 1.5 meters and less, respectively.

16. Photographic apparatus with mechanism defined in claim 15, wherein said focussing means are adapted so that said distance focussing scale is further corrected by additional amounts which increase as the distance decreases and are sufficient to compensate for said optical decrease in illumination.

17. Photographic apparatus with mechanism defined in claim 1 wherein said diaphragm setting member is a rotatable ring, said diaphragm adjusting means comprising a reduction gear interposed between said diaphragm setting ring and a second rotatable ring arranged to operatively control said adjustable diaphragm.

18. Photographic apparatus with mechanism defined in claim 1 wherein said coupling means comprise a flash-factor-selector-and-setting-device having two members rotatably arranged concentrically with one another, each of said members being operatively connected with one of said setting members to be coupled with one another, said two concentric members being directly connectable for common rotation in a series of different relative positions of the two members, the one of said members having disposed thereon a scale cooperating with an index disposed on said other of the members operative to indicate the relative position in which said two members and said two setting members have been coupled which relative position corresponds to the specific flash factor to which the mechanism has been set.

19. Photographic apparatus with mechanism defined in claim 18 wherein said one of the two members of the flash-factor setting device has formed therein a plurality of recesses and in which said other of the two members comprises a slide mounted therein for radial movement, said slide having a radial projection adapted to selectively engage any of said recesses for coupling said two members of the coupling means and, accordingly, said two setting members.

20. Photographic apparatus as claimed in claim 1 comprising a logarithmic distance scale upon the focus setting member to indicate the logarithmic relationship between the displacements of the focus setting member and the distance values to which the camera is focussed by such displacements.

21. Photographic apparatus with mechanism defined in claim 8 wherein said coupling means comprise a second shaft arranged in substantially rectangular relationship to said first shaft and connected therewith by bevel gears, said second shaft operatively connecting said first shaft and said focus setting member mounted thereon at one of the walls of the camera housing to the diaphragm setting member mounted at another one of the walls substantially rectangular to said one wall, said other wall having further mounted thereon said lens.

References Cited in the file of this patent

UNITED STATES PATENTS

| | | |
|---|---|---|
| 2,315,977 | Mihalyi | Apr. 6, 1943 |
| 2,334,075 | Davenport | Nov. 9, 1943 |
| 2,464,559 | Davenport et al. | Mar. 15, 1949 |
| 2,596,328 | Dorsey | May 13, 1952 |

FOREIGN PATENTS

| | | |
|---|---|---|
| 763,295 | Great Britain | Dec. 12, 1956 |

OTHER REFERENCES

Korhammer: German application Z4899, printed March 8, 1956 (KL 57a Gruppe 32–05).